United States Patent [19]
Nishimura et al.
[11] Patent Number: 4,963,447
[45] Date of Patent: Oct. 16, 1990

[54] ALKALINE CELL WITH GELLED ANODE

[75] Inventors: Joji Nishimura, Hirakata; Yuji Mototani, Yawata; Junichi Asaoka, Ikoma; Noriyuki Yanagawa, Yokohama; Hiroshi Touma, Hiratsuka, all of Japan

[73] Assignees: Matsushita Electric Industrial Co., Ltd., Osaka; Nihon Junyaku Co., Ltd., Tokyo, both of Japan

[21] Appl. No.: 476,755

[22] Filed: Feb. 8, 1990

[51] Int. Cl.$^{5}$ ........................ H01M 4/62; H01M 4/02
[52] U.S. Cl. .................................... 429/206; 429/165; 429/212; 429/230
[58] Field of Search ............... 429/206, 230, 224, 165, 429/229, 212

[56] References Cited

U.S. PATENT DOCUMENTS 3,884,721 5/1975 Tucholski ............................ 429/206
4,209,577 6/1980 Clash .................................... 429/206
4,332,870 6/1982 Parsen et al. ......................... 429/206
4,857,424 8/1989 Larsen et al. ......................... 429/206

*Primary Examiner*—Anthony Skapars
*Attorney, Agent, or Firm*—Stevens, Davis, Miller & Mosher

[57] ABSTRACT

An alkaline cell having a gelled zinc negative electrode solely or mainly using, as a gelling agent to hold a zinc powder in an alkaline electrolyte, a granular crosslinking type branched polyacrylic acid, polymethacrylic acid or salts thereof.

This gelling agent, holding an alkaline electrolyte, swells and properly maintains the thickness of the electrolyte, whereby the electrolyte can be sufficiently fed to a cell reaction portion and the alkaline cell is imparted with excellent drop resistance and shelf stability.

8 Claims, 1 Drawing Sheet

8
5
1
2
6
3
4
9
10
7

ALKALINE CELL WITH GELLED ANODE

BACKGROUND OF THE INVENTION

This invention relates to an electric cell using alkaline electrolyte, and more specifically, it relates to an alkaline cell using a gelled zinc negative electrode, which has excellent shock resistance and suffers less deterioration in heavy-load discharge due to improvement of its gelling agent for the gelled zinc negative electrode.

Related Art Statement

Conventional alkaline cells use carboxymethyl cellulose ("CMC" hereinbelow), crosslinking type branched polyacrylic acid or sodium salt thereof, natural gum, or the like as a gelling agent for the gelled negative electrode.

The gelled negative electrode formed by dispersing a zinc powder in a gelled electrolyte with CMC as a gelling agent retains a good gel state in the initial stage. However, with the passage of time, CMC undergoes syneresis, and the electrode falls out of the gel state. And, zinc powders, having a large specific gravity, precipitate to reduce the reaction effective surface area of the zinc to a great extent. As a result, the cell suffers a great reduction in discharge performance.

On the other hand, the crosslinking type branched polyacrylic acid or a sodium salt thereof and natural gum are relatively stable to alkaline electrolyte and capable of maintaining a good dispersion state of the negative electrode zinc powder for a long period of time. However, these gelling agents are all fine powders and easily dissolved in alkaline electrolyte. And, when strong shock is exerted on a cell, e.g. when the cell is dropped or strong vibration is exerted thereon, the gelled negative electrode fluidizes, and the contact among zinc particles dispersed in the gelled electrolyte and/or that between the zinc particles and a negative electrode current collector becomes unstable. As a result, the electricity production effect of the cell is liable to become unstable or incomplete.

Furthermore, in order to cope with environmental pollution problems, there is nowadays an increasing demand to decrease the mercury content in the cell negative electrode. When the mercury content in the amalgamated zinc becomes 1% by weight or less, the mercury almost fails to give an effect of stabilization of electric characteristic by strengthening the contact among zinc particles or between the zinc particles and the collector. Hence, strong shock to the cell causes problems that a short circuit current occurs in the cell, the interterminal voltage at the initial discharge stage is badly lowered, and similar problems, which are fatal to cell characteristics.

One of the means to prevent the above problems is to increase the volume content of the zinc powder in the gelled negative electrode so that the degree of contact among the zinc particles or between the zinc particles and the collector is increased. For this purpose, however, it is necessary to increase the zinc powder volume considerably. As a result, a volume balance between the negative electrode and positive electrode is lost, and the amount of electrolyte necessary for a discharge reaction is relatively lowered, which leads to discharge characteristic reduction. Thus, this means cannot be said to be reasonable.

In order to obtain an alkaline cell having high shock resistance, the necessary method is to use a gelling agent having a large particle diameter and achieve an effect of increasing the zinc powder volume content in portions other than the swollen gelling agent-occupied portions in the gelled negative electrode. As the gelling agent having a large particle diameter, it is possible to illustrate crosslinking type branched sodium polyacrylate produced, in general, by mass polymerization, suspension polymerization, or emulsion polymerization.

Concerning the above processes for the production of the gelling agent having a large particle diameter, the mass polymerization includes a step of obtaining a prescribed particle diameter by pulverizing mass-polymerized, crosslinking type branched sodium polyacrylate, and in the suspension polymerization, an aqueous solution of sodium acrylate is polymerized in an organic solvent with a dispersant or emulsifier to give a suitable sphere particle diameter. Further, in the emulsion polymerization, a large particle diameter is obtained by polymerizing sodium acrylate in the presence of an emulsifier.

The crosslinking type branched sodium polyacrylate produced as above exhibits an anti-shock effect. However, the polymerization backbone chain thereof (formed without adding any crosslinking agent) has a polymer molecular weight of 50,000 to 60,000 or more, and it is crosslinked too uniformly. Thus, even if the particle size distribution thereof is varied by pulverization or changing its polymerization conditions, etc., cores are liable to be formed inside individual particles thereof. When these particles are put into alkaline electrolyte, they fail to contain a sufficient volume of the electrolyte. And, even if no cores are formed, electrolyte, absorbed into the particles is uniformly and firmly retained in the gel. Hence, the electrolyte cannot be easily drawn out of the gelling agent even during a reaction of the negative electrode zinc, and is not sufficiently utilized. As a result, the internal resistance of the cell increases, and the electrolyte required for a negative electrode reaction is inadequately supplied, whereby the discharge performance is lowered. In particular, it is lowered in heavy-load discharge.

OBJECT AND SUMMARY OF THE INVENTION

It is an object of this invention to provide an excellent alkaline cell having improved characteristics which can provide shock resistance and good performance under heavy-load discharge.

DETAILED DESCRIPTION OF PREFERRED EMBODIMENT

Figure 1:
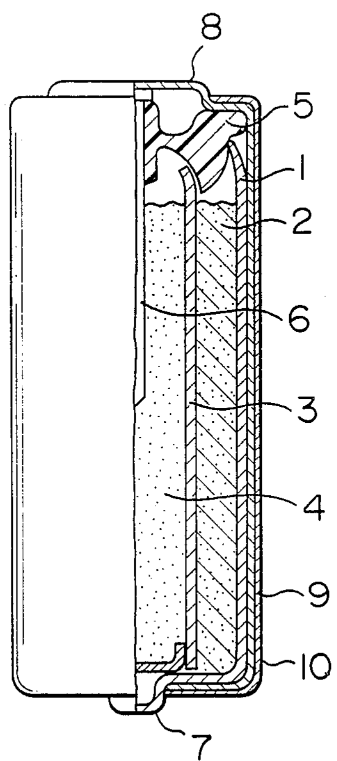
FIG. 1 shows a half front and half cross sectional view of a cylindrical alkaline cell of this invention.

The present alkaline cell comprises an alkaline electrode, a gelling agent and a zinc powder as main components; said gelling agent being composed solely or mainly of a granular crosslinking type branched polyacrylic acid having a main particle diameter of 200 to 900 microns and granulated during or after deposition-polymerization or its salt, or granular crosslinking type branched polymethacrylic acid having a main particle diameter of 200 to 900 microns and granulated during or after deposition-polymerization or its salt.

More specifically, the feature of the above gelling agent is that the acrylic acid or its salt, or the methacrylic acid or its salt is crosslinked during its polymerization reaction by using a crosslinking agent comprising a polyvalent allyl crosslinking agent as a main component and a polyvalent vinyl crosslinking agent.

The polyvalent allyl crosslinking agent is a compound having, in the molecule, at least two terminal allyl groups (C—C═C—), which do not easily undergo polymerization alone in radical polymerization, and ether or carbon bonds with the allyl groups. Examples thereof include diallyl ether, diallylethylene glycol ether, tri(di)allylglycerol ether, tetraallyloxyethane, polyvalent allylsucrose ether, etc. The polyvalent vinyl crosslinking agent is a compound having, in the molecule, at least two terminal vinyl groups (C═C—), which easily undergo a reaction alone in radical polymerization, or having, in the molecule, vinyl and allyl groups in combination. Examples thereof are allyl acrylate, divinyl benzene, ethylene glycol diacrylate, polyvalent acrylic acid sucrose ester, etc.

It is known that these crosslinking agents are individually used to crosslink a gelled thickening agent in a deposition polymerization system. However, the use of the polyvalent allyl crosslinking agent alone gives a soluble crosslinked product, but does not give a swollen product. Thus, the resultant cell has low shock resistance. Further, the use of the polyvalent vinyl crosslinking agent alone gives an insoluble swollen gell, and the resultant cell has low discharge performance, although it has high strength to shock. Further, the amount of the polyvalent allyl crosslinking agent is 0.05 to 5% by weight based on the acrylic acid or methacrylic acid. When this amount is less than 0.05% by weight, it does not function as a thickening agent. When the amount is more than 5% by weight, the resultant gell is insoluble, and no swelling property is imparted. Further, the amount of the polyvalent vinyl crosslinking agent is 0.05 to 4% by weight based on the acrylic acid or methacrylic acid. When this amount is less than 0.05% by weight, there is no effect on the improvement for shock resistance, and such a crosslinking agent is nothing but a known thickening agent polymerized by using a polyvalent allyl crosslinking agent. When the amount is more than 4% by weight, no swelling property is obtained The gelling agent of this invention is that which is formed in the presence of a mixture of a polyvalent allyl crosslinking agent with a polyvalent vinyl crosslinking agent, and further granulated. And, it has been found that the above defects of the electric cell characteristics can be overcome by using this gelling agent. Therefore, the gelling agent of this invention is a granular branched carboxyvinyl polymer formed by incorporating the above crosslinking agents which are mixed in a mixing ratio in the above specified range, adding soluble solvents such as water, alcohol, etc., during deposition polymerization and forming granular particles from the resultant deposited small particles, or forming particles in the presence of water, alcohol, etc., after the deposition polymerization and granulating the particles. The gelling agent preferably has not less than 50% by weight of granular particles having a particle diameter of 200 to 900 microns.

The gelling agent of this invention retains a swollen state in a gelled negative electrode and has zinc particles pushed into spaces among its swollen particles. Thus, the volume content of the zinc powder in the portion is substantially increased, the contact among the zinc particles or between the zinc particles and the negative electrode current collector is strengthened, and an electricity production effect can be stably maintained for a long period of time even if the cell is strongly shocked, e.g. when it is dropped or vibrated. This effect is greatly exhibited particularly when there is used a zinc powder in which the mercury amount is reduced or the mercury content in the amalgamated zinc is 1% by weight or less. Further, the swollen gelling agent adequately holds the electrolyte necessary for a discharge reaction, controls the rise of the internal resistance and disperses the electrolyte out of itself, whereby the cell performance stabilization is achieved.

The shock resistance can be suitably improved by using the granular gelling agent mainly composed of particles having a particle diameter of 200 to 900 microns.

Examples

In an alkaline cell shown in FIG. 1, within a positive electrode case 1 is placed a cylindrically preshaped positive electrode combined material 2 composed of manganese dioxide and graphite, a cup-shaped separator 3 is inserted in the middle portions thereof, and then a gelled zinc negative electrode 4 is injected into the cup-shaped separator 3. Thereafter, a negative electrode current collector 6 with which a gasket 5 is integrated is inserted into the central portion of the gelled negative electrode 4 to form a simple cell. 7 indicates a positive electrode terminal, 8, a negative electrode terminal, 9, a housing, and 10, an insulating tube.

The gelled zinc negative electrode is constituted of an alkaline electrolyte composed of potassium hydroxide, zinc oxide and water, a gelling agent and a zinc powder having a mercury content in the amalgamated zinc of 0.1% by weight.

The gelling agent above was formed in the presence of a crosslinking agent containing a mixture of a polyvalent allyl crosslinking agent as a main component with a polyvalent vinyl crosslinking agent. That is, a beaker was charged with 200 g of acrylic acid, 1 g of polyvalent allyl sucrose ether, 0.5 g of divinyl benzene, 0.5 g of benzole peroxide and 20 g of methanol, and they were mixed. Then, a 2000-milliliter flask with a stirrer was charged with 900 g of benzene, and its temperature was elevated to 75° C. Half of the mixture in the beaker was added to the flask to start polymerization. One hour later, the other half of the mixture was added to continue deposition-polymerization further for 2 hours, whereby a granular crosslinking type branched polyacrylic acid was obtained in which more than 50% by weight of its particles had a particle diameter of 200 to 900 microns. An LR6 alkaline cell (AA size) using, as a gelling agent, this granular crosslinking type branched polyacrylic acid, provided by this invention, is referred to as dry cell A. Further, 200 kg of methacrylic acid, 1 kg of tetraalkyloxyethane, 0.6 kg of polyethylene glycol diacrylate, 1 kg of 2,2′-azobis-2-methylvaleronitrile and 100 kg of ethanol were mixed. Then, a 2000-liter reaction vessel with a stirrer was charged with 900 kg of triol, its temperature was elevated to 80° C., and half of the mixture was added to start polymerization. One hour and half later, the remaining mixture was added to carry out deposition-polymerization further, whereby a granular crosslinking type branched polymethacrylic acid was obtained in which more than 50% by weight of its particles had a particle diameter of 200 to 900 microns. An LR6 alkaline cell using, as a gelling agent, this granular polymethacrylic acid, provided by this invention, is referred to as dry cell B.

For comparison, the following dry cells were prepared: An LR6 alkaline cell using a conventional crosslinking type branched sodium polyacryate (dry cell C), an LR6 cell using a gelling agent using a granular polyvalent allyl crosslinking agent alone (dry cell D), in which the gelling agent was a granular crosslinking type branched polyacrylic acid polymerized in the same way as in the preparation of the gelling agent for the dry cell A except that no divinyl benzene was used and that the amount of polyvalent allyl sucrose ether was changed from 1 g to 1.5 g, and an LR6 cell using a gelling agent using a granular polyvalent allyl crosslinking agent alone (dry cell E), in which the gelling agent was a granular crosslinking type branched polymethacrylic acid polymerized in the same way as in the preparation of the gelling agent for the dry cell B except that no polyethylene glycol diacrylate was used and that the amount of tetraoxyethane was changed to 1.3 kg.

Further, alkaline dry cells were prepared by using a gelling agent using a polyvalent vinyl crosslinking agent alone: An LR6 dry cell F in which the gelling agent was a granular crosslinking type branched polyacrylic acid polymerized in the same way as in the preparation of the gelling agent for the above dry cell A except that no polyvalent allyl sucrose ether was used and that the amount of the divinyl benzene was changed from 0.5 g to 1.5 g, and an LR6 dry cell G in which the gelling agent was a granular crosslinking type branched polymethacrylic acid polymerized in the same way as in the preparation of the gelling agent for the above dry cell B except that no tetraallyloxyethane was used and that the amount of the polyethylene glycol diacrylate was changed to 1 kg.

A sodium acrylate solution for polymerization was prepared from 1,000 g of 35% sodium acrylate aqueous solution, 10 g of polyethylene glycol diacrylate and 1 g of ammonium persulfate, and the solution was subjected to mass-polymerization to give a polymer. The polymer was dried and pulverized to give a crosslinking type branched sodium polyacrylate in which not less than 50% by weight of its particles had a particle diameter of 200 to 900 microns. An LR6 alkaline dry cell using same is referred to as dry cell H. Similarly, a potassium methacrylate solution for polymerization was prepared from 1,000 g of 30% potassium methacrylate aqueous solution, 7.5 g of polyethylene glycol diacrylate and 1 g of ammonium persulfate, and the solution was subjected to mass-polymerization to give a polymer. The polymer was dried and pulverized to give a crosslinking type branched potassium polymethacrylate in which not less than 50% by weight of its particles had a particle diameter of 200 to 900 microns. An LR6 alkaline dry cell using it is referred to as dry cell I. Further, the same sodium acrylate solution for polymerization as that for the above H was subjected to suspension polymerization in a mixture of 2,000 g of triol with 20 g of polyethylene glycol monooleate to give a crosslinking type branched sodium polyacrylate in which not less than 50% by weight of its particles had a particle diameter of 200 to 900 microns. An LR6 alkaline dry cell using it is referred to as dry cell J. Similarly, the same potassium methacrylate solution for polymerization as that for the above I was subjected to suspension polymerization in a mixture of 2,000 g of triol with 18 g of polyethylene glycol monooleate to give a crosslinking type branched potassium polymethacrylate in which not less than 50% by weight of its particles had a particle diameter of 200 to 900 microns. An LR6 alkaline dry cell using it is referred to as dry cell K.

The above dry cells A to K were dropped five times from a height of 1 m at 20° C., and a short circuit current of each of the cells after they were dropped was compared with a short circuit current measured before they were dropped. Table shows ratios, in percentage, of the short circuit currents after the dropping to the short circuit currents before the dropping.

Table 2 shows discharge retention times when the above dry cells A to K were discharged at 20° C. at various currents until their voltage became 0.9 V.

TABLE 1

| | Dropping times | | | | |
|---|---|---|---|---|---|
| Cell | 1 | 2 | 3 | 4 | 5 |
| A | 95% | 93% | 90% | 87% | 85% |
| B | 95 | 92 | 88 | 86 | 84 |
| C | 60 | 43 | 38 | 28 | 25 |
| D | 68 | 48 | 42 | 33 | 29 |
| E | 65 | 47 | 40 | 30 | 27 |
| F | 89 | 84 | 78 | 72 | 69 |
| G | 86 | 82 | 75 | 68 | 65 |
| H | 92 | 88 | 83 | 81 | 77 |
| I | 93 | 88 | 81 | 79 | 76 |
| J | 90 | 86 | 82 | 78 | 72 |
| K | 89 | 88 | 83 | 77 | 74 |

TABLE 2

| | Discharge current (mA) | | | | |
|---|---|---|---|---|---|
| Cell | 500 | 250 | 100 | 50 | 10 |
| A | 125 min. | 340 min. | 18.5 hrs. | 41 hrs. | 225 hrs. |
| B | 124 | 336 | 18.5 | 40 | 226 |
| C | 128 | 328 | 18.3 | 40 | 222 |
| D | 121 | 331 | 18.1 | 40 | 220 |
| E | 120 | 329 | 18.0 | 39 | 200 |
| F | 105 | 311 | 16.8 | 36 | 199 |
| G | 107 | 313 | 16.1 | 32 | 196 |
| H | 103 | 303 | 16.4 | 35 | 197 |
| I | 104 | 301 | 16.3 | 36 | 196 |
| J | 101 | 298 | 15.9 | 32 | 188 |
| K | 102 | 300 | 16.0 | 31 | 188 |

Tables 1 and 2 clearly show that the cells A and B using the gelling agents of this invention had excellent drop characteristics and discharge performance over the cells, C, D, E, F, G, H, I, J and K which used other gelling agents. In addition, each of the cells shown in Tables 1 and 2 contained 4% by weight of the gelling agent based on the alkaline electrolyte. The discharge times of cells using the gelling agent of this invention and cells using the other gelling agent were compared by changing the gelling agent amounts, and it was found that, when the gelling agent amounts were equal among the compared cells and in the range of 2 to 8% by weight, the cells using the gelling agent of this invention were superior to those using the other gelling agent.

The cell C using a conventional crosslinking type branched sodium polyacrylate had very poor drop characteristics, since the gelled negative electrode was liable to fluidize. And, when it was discharged without applying any shock, it was possible to obtain a sufficient discharge performance. The cells D and E had low strength to shock. The cells F and G had low discharge characteristic although they had strength to shock. Further, the cells H, I, J and K were comparatively stable to dropping, however, their discharge performance was low, since their internal resistance increased and their electrolyte did not sufficiently contribute to a discharge reaction.

In the cells A and B of this invention, their gelling agents are granular crosslinking type branched polyacrylic acids formed by deposition-polymerization, which are sponge-like granular polymers having many pores in each of the particles, and the polymers have high shock-absorbing cushion property, or can resist shock sufficiently. Furthermore, the polymers can easily contain a sufficient amount of electrolyte and easily provide the electrolyte out of themselves during discharge. These are considered to be reasons why the cells A and B of this invention were particularly excellent in shock resistance and discharge characteristics.

The cell A of this invention shown in Examples is an LR6 alkaline dry cell using a granular crosslinking type branched polyacrylic acid granulated during deposition-polymerization. In addition, shock resistance and discharge performance of a cell using a gelling agent, which was granulated after deposition-polymerization as follows, were also examined, i.e. a 2000 milliliter flask with a stirrer was charged with 100 g of acrylic acid, 1 g of polyvalent allyl sucrose ether, 0.5 g of allyl acrylate, 0.5 g of benzoyl peroxide and 900 g of benzene, and the temperature inside the flask was elevated to 75° C. to start polymerization. While the reaction peak was maintained at 85° C., the polymerization was continued for about 4 hours to give a polymer. The solvent was separated from the polymer, and the polymer was dried. Then, the polymer was granulated into particles having a particle diameter of 200 to 900 microns in the presence of water and methanol as binders by using a granulator. As a result, the examination of a cell using the resultant gelling agent showed results as excellent as those of the cell A. Similarly, 200 kg of methacrylic acid, 1 kg of tetraallyloxyethane, 0.6 kg of polyethylene glycol diacrylate and 1 kg of 2,2'-azobis-2-methylvaleronitrile were mixed, and then 900 kg of triol was charged into a 2,000-liter reaction vessel with a stirrer. The temperature inside the vessel was elevated to 80° C., and all of the above mixture was put to the vessel to start polymerization. While the reaction peak was maintained at 85° C., the polymerization was continued for about 8 hours to give a polymer. The solvent was separated from the polymer, and the polymer was dried. The polymer was granulated into particles having a diameter of 200 to 900 microns in the presence of water and isopropyl alcohol by using a granulator. The shock resistance and discharge characteristics of a cell using the above granular polymer as a gelling agent were examined to show excellent results like those of the cell B.

Further, LR6 alkaline cells were prepared, of which the gelled negative electrodes were formed by using 4% by weight, based on an alkaline electrolyte, of granular crosslinking type branched polyacrylic acids having particle diameters shown in Table 3, and drop resistance characteristics of the cells were examined in the same way as in the examination of which the results are shown in Table 1. Table 3 shows the results.

In Table 3, o stands for a region of particle diameters of the acids in which no abnormality occurred (the short circuit current of a cell dropped five times was not less than 70% of that of the cell measured before it was dropped). Δ stands for a region in which abnormality might occur (70–50%) X stands for a region in which abnormality occurred (not more than 50%).

TABLE 3

| | Diameter of granular crosslinking type branched polyacrylic acid before swollen | | | | |
|---|---|---|---|---|---|
| | less than 50 | 50–200 | 200–500 | 500–900 | more than 900 |
| Drop resistance characteristics | x | Δ | o | o | o |

Table 3 shows that the polyacrylic acids having a particle diameter of not less than 200 microns before swelling were suitable for cells. When the polyacrylic acids having a particle diameter of not less than 900 microns before swelling were used as gelling agents, the gelling agents had too large diameters after swelling, the contained amount of filled zinc powders was lowered, and discharge characteristics of the resultant cells were degraded.

The above drop resistance characteristics show test results based on particle diameters measured before the granular crosslinking type branched polyacrylic acids were swollen. When there were used gelling agents in which not less than 50% by weight of their particles had a particle diameter of 200 to 900 microns, it was possible to obtain nearly identical good results concerning both drop resistance characteristics and discharge properties.

However, when the amount of the particles having a diameter of 200 to 900 microns decreased to less than 50% by weight, the above drop resistance characteristics were deteriorated sharply.

Therefore, the suitable granular crosslinking type branched polyacrylic acids as a gelling agent for cells using a zinc powder having a mercury content in the amalgamated zinc of not more than 1% by weight are those in which not less than 50% by weight of their particles have a particle diameter of 200 to 900 microns before swollen.

Similarly, LR6 alkaline cells were prepared, of which the gelled negative electrodes were formed by using 4% by weight, based on an alkaline electrolyte, of granular crosslinking type branched polymethacrylic acids having various particle diameters, and drop characteristics of the cells were examined in the same way as in the examination of which the results are shown in Table 1. The results were similar to those of the above granular crosslinking type branched polyacrylic acids.

LR6 alkaline cells having a structure shown in FIG. 1 were prepared, which had a gelled negative electrode using a mixed gelling agent of the granular crosslinking type branched polyacrylic acid of this invention with guar gum, which is a natural gum, and a zinc powder having a mercury content in the amalgamated zinc of 0.6% by weight. And, their drop resistance characteristics and shelf stability were tested.

Table 4 shows presence or absence of abnormality (instability) of a discharge curve which appeared when a cell was dropped from a height of 1 M five times and then its voltage under 1 ohm load was measured for 10 seconds. In Table 4, o indicates no occurrence of abnormality, Δ indicates possible occurrence of abnormality, and X indicates occurrence of abnormality.

TABLE 4

| Granular crosslinking type branched polyacrylic acid (wt %) | Guar gum (wt %) | | | | | | |
|---|---|---|---|---|---|---|---|
| | 0 | 0.2 | 0.4 | 0.6 | 0.8 | 1.0 | 1.2 |
| 0 | | | | | | X | Δ |
| 0.5 | | Δ | | | X | Δ | o |
| 1.0 | | | | X | Δ | o | o |
| 1.5 | | | X | Δ | o | o | ΔC |
| 2.0 | | X | Δ | o | o | o | X |
| 2.5 | X | Δ | o | o | o | Δ | X |
| 3.0 | Δ | o | o | o | Δ | X | |
| 3.5 | o | o | Δ | Δ | X | X | |
| 4.0 | o | Δ | Δ | X | | | |
| 4.5 | o | X | X | | | | |
| 5.0 | Δ | X | | | | B | |
| 5.5 | X | | | | | | |

As is shown in Table 4, in the regions indicating 1.0 to 4.5% by weight of the granular branched polyacrylic acid and 0.2 to 1.0% by weight of the guar gum based on alkaline electrolyte, the drop resistance characteristics of the cells were generally stable.

On the other hand, in regions where the amount of the gelling agent is small, indicated by dots A, a zinc powder could not be sufficiently dispersed in the gelled electrolyte, and the zinc powder was liable to be deposited and separated. Thus, it was difficult to inject the gelled negative electrode when cells were prepared, and further, the cell performance was untable. And, in regions where the amount of the gelling agent is large, indicated by dots B, the gelled negative electrode exhibited high viscosities, the electrode injection was also difficult, the amount of electrolyte was inadequate, and the internal resistance increased. Thus, the resultant cells showed lower discharge performance.

Further, when the guar gum proportion was increased as shown by dots C, the guar gum exhibited high stringiness of its own into the alkaline electrolyte, and it was very difficult to fill the cell with the gelled negative electrode. Thus, it is not desirable to add 1.2% by weight or more of guar gum.

Meanwhile, in order to impart the gelled electrolyte with a necessary viscosity, it is necessary to add a large amount of the granular crosslinking type branched polyacrylic acid when it is used alone. Therefore, the use of crosslinking type branched polyacrylic acid and/or guar gum with which a necessary viscosity can be obtained with a small addition is desirable to improve the cell properties and decrease the gelling agent amount for use.

As a crosslinking agent for the crosslinking type branched polyacrylic acid, a polyvalent allyl crosslinking agent and a polyvalent vinyl crosslinking agent are generally used. For example, polyvalent allyl sucrose ether and divinyl benzene are generally used. When the polyvalent allyl sucrose ether is used alone, the crosslinking type branched polyacrylic acid is sufficiently thickened since it itself has a long molecular chain and its crosslinking distance is long. However, its defect is that the resultant crosslinking type branched polyacrylic acid, particularly as a gelling agent for a negative electrode of an alkaline cell, is made soluble in a strong alkaline electrolyte, and the resultant cell has low strength to shock. And, when divinyl benzene is used alone, the resultant crosslinked gelling agent is insoluble in an alkaline electrolyte, and has insufficient swell degree. Hence, a large amount of the gelling agent is required to obtain a gelled negative electrode, and the internal resistance of the resultant cell increases. As a result, the discharge performance of the cell is deteriorated.

Nearly the same results as above are also found concerning the crosslinking type branched polymethacrylic acid.

Therefore, the use of the crosslinking agent consisting of the polyvalent allyl crosslinking agent as a main component and the polyvalent vinyl crosslinking agent makes it possible to obtain the gelling agent of the granular crosslinking type branched polyacrylic acid or granular crosslinking type branched polymethacrylic acid of this invention, which has both the sufficient thickening and sufficient swelling properties in a strong alakline electrolyte, and the alkaline cells using this gelling agent have given satisfactory results in shock resistance, discharge performance and shelf stability.

As discussed above, this invention can provide alkaline cells having excellent drop resistance and shelf stability by forming their gelled negative electrode mainly composed of an alkaline electrolyte, a gelling agent and a zinc powder, in which the gelling agent uses a granular crosslinking type branched polyacrylic acid composed mainly of particles having a particle diameter of 200 to 900 microns granulated during or after deposition-polymerization in the presence of a binder such as water or alcohol or a salt thereof, or a granular crosslinking type branched polymethacrylic acid composed mainly of particles having a particle diameter of 200 to 900 microns granulated during or after deposition-polymerization in the presence of a binder such as water or alcohol or a salt thereof, solely or in combination with a crosslinking type branched polyacrylic acid, a crosslinking type branched polymethacrylic acid or a guar gum.

What is claimed is:

1. An alkaline cell comprising a positive electrode, an alkaline electrolyte and a gelled negative electrode, the gelled negative electrode being mainly composed of the alkaline electrolyte, a gelling agent and a zinc powder, wherein the gelling agent is solely or mainly composed of a granular crosslinking type branched carboxyvinyl polymer of a main particle diameter of 200 to 900 microns which is granulated during or after deposition-polymerization thereof.

2. An alkaline cell according to claim 1, wherein the zinc powder has a mercury content in the amalgamated zinc of not more than 1% by weight.

3. An alkaline cell according to claim 1, wherein the gelling agent is solely or mainly composed of a granular crosslinking type branched polyacrylic acid of a main particle diameter of 200 to 900 microns which is granulated during or after deposition-polymerization thereof or a salt thereof.

4. An alkaline cell according to claim 1, wherein the gelling agent is solely or mainly composed of a granular crosslinking type branched polymethacrylic acid of a main particle diameter of 200 to 900 microns which is granulated during or after deposition-polymerization thereof or a salt thereof.

5. An alkaline cell according to claim 3, wherein the granular crosslinking type branched polyacrylic acid or the salt thereof is formed by crosslinking an acrylic acid or a salt thereof in the presence of a crosslinking agent prepared by mixing a polyvalent allyl crosslinking agent as a main component with a polyvalent vinyl crosslinking agent.

6. An alkaline cell according to claim 5, wherein the polyvalent allyl crosslinking agent and the polyvalent vinyl crosslinking agent are used in amounts of 0.05 to 5 and 0.05 to 4% by weight, respectively, based on the acrylic acid or the salt thereof.

7. An alkaline cell according to claim 4, wherein the granular crosslinking type branched polymethacrylic acid or the salt thereof is formed by crosslinking a methacrylic acid or a salt thereof in the presence of a crosslinking agent prepared by mixing a polyvalent allyl crosslinking agent as a main component with a polyvalent vinyl crosslinking agent.

8. An alkaline cell according to claim 7, wherein the polyvalent allyl crosslinking agent and the polyvalent vinyl crosslinking agent are used in amounts of 0.05 to 5 and 0.05 to 4% by weight, respectively, based on the methacrylic acid or the salt thereof.

* * * * *

UNITED STATES PATENT AND TRADEMARK OFFICE

CERTIFICATE OF CORRECTION

PATENT NO. : 4,963,447

DATED : October 16, 1990

INVENTOR(S) : Joji NISHIMURA et al

It is certified that error appears in the above-indentified patent and that said Letters Patent is hereby corrected as shown below:

Column 2, lines 56-57, change "electrode" to --electrolyte--.

Column 4, line 41, change "benzole" to --benzoyl--;

line 51, after "alkaline" insert --dry--;

line 55, change "tetraalkyloxyethane" to --tetraallyloxyethane--;

line 66, after "alkaline" insert --dry--.

Column 5, line 2, after "alkaline" insert --dry--;

line 18, change "tetraoxyethane" to --tetraallyloxyethane--.

Column 7, line 54, after "alkaline" insert --dry--.

Column 8, line 43, after "alkaline" insert --dry--;

line 53, after "alkaline" insert --dry--.

Signed and Sealed this

Twenty-second Day of November, 1994

Attest:

Bruce Lehman

BRUCE LEHMAN

*Attesting Officer* *Commissioner of Patents and Trademarks*